United States Patent
Popat

[19]

[11] Patent Number: 6,084,231
[45] Date of Patent: Jul. 4, 2000

[54] CLOSED-LOOP, DAYLIGHT-SENSING, AUTOMATIC WINDOW-COVERING SYSTEM INSENSITIVE TO RADIANT SPECTRUM PRODUCED BY GASEOUS-DISCHARGE LAMPS

[76] Inventor: Pradeep P. Popat, 1515 S. Jefferson Davis Hwy., Apt. 1321, Arlington, Va. 22202

[21] Appl. No.: 08/996,347

[22] Filed: Dec. 22, 1997

[51] Int. Cl.[7] ............................. H01J 40/14; E05F 15/20
[52] U.S. Cl. .................................. 250/214 AL; 318/480; 160/5; 49/25; 315/150
[58] Field of Search ......................... 250/214 AL, 201.1, 250/205, 206; 315/150; 359/601, 613; 318/480, 286; 160/5, 7, 166.1; 49/25

[56] References Cited

U.S. PATENT DOCUMENTS

| | | | |
|---|---|---|---|
| 3,294,152 | 12/1966 | Kuijvenhoven | 160/5 |
| 3,646,985 | 3/1972 | Klann | 160/168 |
| 4,236,101 | 11/1980 | Luchaco | 250/214 AL |
| 4,273,999 | 6/1981 | Pierpoint | 250/205 |
| 4,396,831 | 8/1983 | Yamada | 250/201 |
| 4,622,470 | 11/1986 | Makino | 250/203 R |
| 4,644,990 | 2/1987 | Webb | 160/5 |
| 4,701,669 | 10/1987 | Head et al. | 315/155 |
| 5,142,133 | 8/1992 | Kern | 250/203.4 |
| 5,237,169 | 8/1993 | Grehant | 250/214 AL |
| 5,250,799 | 10/1993 | Werner | 250/214 |
| 5,532,560 | 7/1996 | Element et al. | 318/266 |
| 5,648,656 | 7/1997 | Begemann et al. | 250/214 AL |
| 5,663,621 | 9/1997 | Popat | 318/480 |

OTHER PUBLICATIONS

Selkowitz, S.E.; Lee, E. S.; Rubinstein, F.; Klems, J. H.; Papamichael, K.; Beltran, L. O.; DiBartolomeo, D.; and Sullivan, R; "Realizing the DSM Potential Of Integrated Envelope and Lighting Systems", Oct. 1993, LBL Report No. 34731, Lawrence Berkeley Laboratory, Berkeley, CA.

*Primary Examiner*—Edward P. Westin
*Assistant Examiner*—Thanh X. Luu

[57] ABSTRACT

A system for automatic regulation of daylight admitted by a window in the presence of artificial illumination produced by a high-efficiency (e.g., fluorescent-type) electric lamp. A preferred embodiment, adaptive window covering system 10, consists of an illuminance sensor 11, a conventional control apparatus 12, and a conventional shading means 13. System 10 is used in conjunction with a conventional, high-efficiency, electric lamp 14 and a conventional window 18, in a room 19.

Sensor 11 produces a signal dependent on power contained in a portion of the daylight spectrum, but substantially insensitive to power contained in the spectrum of artificial illumination produced by lamp 14. In a preferred embodiment, sensor 11 includes a silicon photodiode and optical low-pass filter to provide a spectral response which extends from approximately 800 to 1200 nanometers, which falls outside the spectrum produced by typical fluorescent lamps (e.g, 300 to 750 nanometers).

Sensor 11 is oriented to sample the ambient illumination in room 19, which includes both daylight and artificial components. Control apparatus 12 produces an actuating signal dependent on the output of sensor 11. Shading means 13 varies the amount of daylight admitted by window 18 as a function of the actuating signal produced by control apparatus 12. Thus, system 10 varies the amount of daylight admitted by window 18 as a function of the power contained in a portion of the daylight spectrum, but independent of the power contained in the spectrum produced by lamp 14.

14 Claims, 5 Drawing Sheets

CLOSED-LOOP, DAYLIGHT-SENSING, AUTOMATIC WINDOW-COVERING SYSTEM INSENSITIVE TO RADIANT SPECTRUM PRODUCED BY GASEOUS-DISCHARGE LAMPS

BACKGROUND

1. Field of the Invention

This invention relates to automatic window coverings, specifically to an adaptive window covering system which is responsive to the natural (daylight) component of the spectrum of the ambient interior illumination, but insensitive to the spectrum produced by gaseous-discharge (e.g., fluorescent) lamps.

2. Discussion of Prior Art

Adaptive Window Coverings for Energy Savings

An adaptive window covering is a device which automatically self-adjusts to regulate the light admitted by a window. Such a device is particularly useful when used in conjunction with an adaptive lighting system, which automatically brightens or dims a high-efficiency lamp (typically of the gaseous-discharge type) to maintain a desired level of interior illumination. Used together, such systems can save substantial amounts of electricity by taking advantage of available daylight to reduce the need for artificial illumination—while still maintaining the desired quality of interior illumination.

In such an application, the energy savings are roughly proportional to the ratio of natural illumination to artificial illumination. Therefore, it is desirable to have an adaptive window covering which automatically adjusts to admit as much diffuse daylight as possible, without causing excessive brightness or glare to the room occupants. Several adaptive window covering systems suitable for this purpose are known in the art, and these can be grouped into broad two categories: closed-loop systems and open-loop systems.

Closed-loop Systems

A closed-loop adaptive window-covering system includes shading means (e.g., venetian blind, electrochromic panel, or other window covering) to vary the amount of light admitted by the window, measuring means to measure the interior brightness, and control means to register the output of the measuring means and actuate the shading means. For example, prior-art, closed loop systems include:

the window screen disclosed in U.S. Pat. No. 3,294,152 to Kuijvenhoven (1966);

the brightness-regulating venetian blind disclosed in U. S. Pat. No. 3,646,985 to Klann (1972);

the shutter control system disclosed in U.S. Pat. No. 4,396,831 to Yamada et. al. (1983); and the shutter control system disclosed in U.S. Pat. No. 4,622,470 to Makino et. al. (1986).

Such closed-loop systems are capable of accurately regulating the net interior illumination, but suffer from one major problem which limits their energy-savings performance. As previously stated, it is necessary to maximize the ratio of natural to artificial illumination in order to maximize the energy savings. However, in such a closed-loop system, the measuring means measures the net interior illumination, and is incapable of discriminating between the natural and artificial components of the illumination—so the system does not have sufficient information to maximize the natural-to-artificial illumination ratio.

As an illustration of this problem, consider the behavior of such a system in response to an increase in the interior illumination. Such a system will then attempt to reduce the quantity of admitted daylight, even though the optimum energy-saving response (assuming that the admitted daylight is not excessively bright) would instead be to maintain the quantity of admitted daylight, while allowing the adaptive lighting system to reduce the brightness of the electric lights.

Coupling Between Lighting and Window-covering Systems

Some prior-art closed-loop systems attempt to solve the aforementioned problem by coupling the lighting system with the window-covering system. This can be done in two ways:

The systems can be "loosely coupled", in which each system conveys its status (e.g., via an electrical signal) to the other system. This enables the window covering system to "know" the setting of the lighting system, and the lighting system to "know" the setting of the window-covering system. This, in turn, provides each system with sufficient information to operate in a way which maximizes energy savings. For example, the window covering system might be assigned an operating protocol which prohibits reducing the level of daylight unless the lighting system is already at minimum brightness, while the lighting system might be assigned a protocol which prohibits increasing the level of artificial light unless the window covering is already fully open.

Alternatively, the systems can be "tightly coupled", sharing a common control element. This enables very sophisticated operating protocols which can achieve a high degree of energy efficiency. Such tightly coupled systems are disclosed, for example, by Selkowitz et. al. ("Realizing the DSM Potential Of Integrated Envelope and Lighting Systems", October 1993, LBL Report No. 34731, Lawrence Berkeley Laboratory, Berkeley, Calif.), and in U.S. Pat. No. 5,237,169 to Grehant (1993).

However, while coupling between the lighting and window-covering systems can solve the aforementioned problem, this approach suffers from two serious limitations:

The coupling between the two systems substantially increases the net cost. This cost increase comes in the form of either increased installation labor (when hard-wired connections are used), or increased hardware costs (when wireless connections are used).

Many adaptive lighting systems are already installed and in use in the U.S., but a substantial fraction of these lack the necessary hardware and software interfaces to couple to an adaptive window-covering system. Moreover, even among those adaptive lighting systems which do have the necessary interfaces, there is limited standardization in the interface design and operating protocol. Therefore, the coupling approach is disadvantageous in the context of retrofit applications, in which a new adaptive window-covering system is used in conjunction with an existing adaptive lighting system.

Tailored Orientation of Measuring Means

Other prior-art, closed-loop, adaptive window-covering systems attempt to solve the problem of maximizing the natural-to-artificial illumination ratio by orienting the measuring means to face toward the window and restricting its field-of-view to the window area. In this way, the measuring senses primarily the admitted daylight, rather than the illumination generated by the lighting system. Such an approach is shown, for example, in the aforementioned disclosures of Makino and Yamada. In principle, such a system can maximize the natural-to-artificial illumination ratio by always admitting the desired maximum quantity of daylight.

However, in practice, this approach has a major limitation: unless the sensor is located close to the occupants of the room, the brightness measured by the sensor will not accurately indicate the brightness of the daylight sensed by the room occupants. For example, if the sensor is located near the bottom of the window and an occupant is seated near the center of the room, the sensor output will be maximized for high solar elevation angles, while the brightness sensed by the occupant will be maximized for medium solar elevation angles. Thus, for good performance, the sensor must be located near the room occupants, but this creates two additional problems. First, the required wiring (or other means of interconnection) between the sensor and the shading means increases the net cost of the system (via increased installation labor costs in the case of a hard-wired connection, or increased hardware costs, in the case of a wireless connection). Second, locating the sensor near the room occupants makes it difficult to exclude light from artificial sources, so that the sensor cannot accurately measure just the daylight component of the interior illumination.

An approach potentially capable of mitigating the difficulties outlined in the preceding paragraph is disclosed in U.S. Pat. No. 4,273,999 to Pierpoint (1981). Pierpoint shows an adaptive lighting system which maintains a predetermined, desired ratio of background-to-task illuminance at one or more work locations. Pierpoint's approach requires information concerning the daylight component of the illuminance at each location, which—as in the case of the Makino and Yamada systems—is obtained by means of window-mounted daylight sensors. However, Pierpoint also discloses a calibration step, in which a set of correlation coefficients are calculated which relate the sensor output to the actual daylight illuminance at a desired point in the room (as measured by specialized illumination instrumentation). After calibration is complete, the specialized instrumentation is no longer required, and the correlation coefficients can then be used to accurately infer the daylight illuminance solely from the output of the sensors. Although Pierpoint shows this technique in the context of an adaptive lighting system, the skilled artisan will appreciate that a similar technique could be used in an adaptive window-covering system, potentially overcoming some of the aforementioned difficulties.

However, Pierpoint's approach suffers from two serious disadvantages. First, the data used to calculate the correlation coefficients must span the full range of expected variation in weather and the position of the sun, requiring a very lengthy calibration process (ostensibly extending over a full year, in order to capture the full range of variation in the solar position). Second, a large number of correlation coefficients are required to adequately sample the full range of expected variation in environmental conditions. Third, Pierpoint's approach requires sufficient data memory to store the coefficients—and sufficient computing power to process them—to obtain the desired daylight illuminance estimates, increasing the cost of the required hardware and reducing its commercial viability.

Tailored Response Times

Still other prior-art closed-loop systems attempt to solve the problem of maximizing the natural-to-artificial illumination ratio by tailoring the response times of the window-covering and lighting systems. For example, the window-covering system can be designed to respond more quickly than the lighting system to dropping light, but less quickly to rising light levels. Then, if the net interior illumination suddenly increases, there will be a delay before the adaptive window covering reduces the quantity of admitted daylight, while the adaptive lighting system quickly dims to reduce the total illumination to the desired level. Conversely, if the net interior illumination suddenly decreases, there will be a delay before the adaptive lighting system brightens, allowing the adaptive window covering sufficient time to increase the quantity of admitted daylight. Such an approach is suggested, for example, in U.S. Pat. No. 5,237,169 to Grehant. In principle, such a scheme can maximize the natural-to-artificial illumination ratio without any connections between the window covering and lighting systems. However, such an approach suffers from at least three limitations.

First, window coverings employing mechanical shading means (such as venetian blinds) have a response time exceeding several seconds. Therefore, to implement this scheme, the lighting system's response time to decreasing light levels must be made very long (e.g., ten seconds), in order to allow the window covering sufficient time to complete its adjustment first. This can cause periods of inadequate interior illumination whenever the total interior illumination decreases.

Second, substantial intervals of inadequate or excessive brightness can occur when either the window covering or the lighting system reaches its limit of adjustment. For example, when the window covering is fully open and the light level decreases, there will be a period of inadequate illumination due to the intentional delay in the response of the lighting system. Similarly, when the lighting system is fully dimmed and the light level increases, there will be a period of excessive illumination due to the intentional delay in the response of the window covering system.

Third, this approach is disadvantageous in retrofit applications (in which a new adaptive window-covering system is used with an existing adaptive lighting system), since few existing adaptive lighting systems are capable of adjustable response times (and even fewer are capable of providing different response times to rising and diminishing light levels).

Open-loop Systems

Some of the aforementioned disadvantages of closed-loop systems can be overcome through use of open-loop techniques. An open-loop control system is one in which the variable to be regulated (in this case, the brightness of the admitted daylight) is not measured directly, but inferred from other information.

Open-loop techniques are feasible for adaptive window coverings because the transfer functions of many types of window coverings are known in the art (the transfer function of a window covering is a mathematical expression which defines the relationship between the incident and admitted illumination).

In an open-loop adaptive window-covering system, the measuring means measures the exterior, rather than interior, illumination. The control means then adjusts the shading means to a position which is a function of the exterior illumination, the desired quantity of admitted daylight, and the known transfer function of the shading means. This allows the illumination sensor to be located on the outward-facing side of the shading means, substantially reducing the errors caused by inadvertent sensing of the illumination produced by the electric lighting system. Thus, the open-loop approach is capable of maximizing the ratio of natural-to-artificial illumination, without any need for connections between the window-covering and lighting systems.

Two forms of open-loop control are known in the art:

In a binary control system, the setting of the window covering alternates between two states (typically open and closed) as a function of the exterior light level. Systems providing the well-known "open-at-dawn, close-at-dusk" capability fall into this category. For example, the systems disclosed in U.S. Pat. No. 4,644,990 to Webb Sr. (1987) and U.S. Pat. No. 5,142,133 to Kern (1992) provide such a capability, and such systems have been available commercially for many years.

Since these binary systems typically alternate between open and closed settings, there is no need to accurately characterize the transfer function of the venetian blind. Moreover, such systems are relatively easy to implement. However, they provide no dynamic regulation whatsoever of the admitted daylight (unless other means are added for that purpose, as in the case of Kern's system), and are therefore incapable of maximizing the ratio of natural to artificial illumination while simultaneously shielding the occupants from excessive brightness and glare.

In a proportional control system, the setting of the window covering varies more-or-less smoothly as a function of the exterior brightness level. The system disclosed in U.S. Pat. No. 5,532,560 to Element et al. (1996) is such a system. Another system providing an open-loop, proportional-control system is disclosed in my U.S. Pat. No. 5,663,621 (1997). As I discuss in detail in that disclosure, such a system is, in principle, capable of maximizing the ratio of natural to artificial illumination while simultaneously shielding the occupants from excessive brightness and glare.

However, the accuracy of open-loop, proportional-control systems in maintaining the desired quantity of admitted daylight depends, in turn, on the accuracy of the assumed transfer function. For many types of window coverings (e.g., venetian blinds), the transfer function is extremely complex, and can be practically implemented only with certain simplifications which reduce its accuracy. As discussed in my aforementioned patent, the resulting loss of accuracy is not an issue in many applications, and open-loop regulation is often sufficient. However, other applications require a level of accuracy which can only be provided by closed-loop systems.

SUMMARY OF PRIOR-ART LIMITATIONS

As discussed above, prior-art adaptive window covering suffer from one or more of four disadvantages:

they are unable to operate to maximize the ratio of natural to artificial illumination;

they require interconnection with the lighting system, increasing system cost;

they require modification to the existing lighting system, precluding retrofit applications; or they provide brightness-regulating accuracy which is inadequate for some applications.

OBJECTS AND ADVANTAGES

It is therefore an object of this invention to provide an adaptive window covering system which:

is capable of maximizing the ratio of natural to artificial illumination by automatically regulating the quantity of admitted daylight;

requires no connection to the lighting system;

requires no modification to the lighting system; and provides the accuracy of a closed-loop system.

Further objects and advantages will become apparent from a consideration of the drawings and ensuing description.

LIST OF REFERENCE NUMERALS

| 10 | Adaptive window covering system | 18 | window |
| 11 | Illuminance sensor | 19 | perimeter room |
| 12 | Control apparatus | 20 | conventional adaptive lighting system |
| 13 | Shading means | 21 | conventional illuminance sensor |
| 14 | Electric lamp | | |
| 15–17 | software steps | 22 | desk |

SUMMARY OF THE INVENTION

My invention is an adaptive window-covering system (intended especially for use with a separate, conventional, adaptively dimming lighting system) for energy-savings applications. It exploits three facts:

lighting systems intended for energy-sensitive applications typically use gaseous-discharge (e.g., fluorescent) lamps;

to maximize efficiency, such lamps intentionally produce negligible power at wavelengths outside the visible spectrum; and daylight, on the other hand, has substantial power at wavelengths outside the visible spectrum.

Accordingly, my invention is a closed-loop illumination-regulation system which includes an illumination senor sensitive only to wavelengths longer or shorter than those produced by the lighting system (e.g., longer than approximately 800 nanometers or shorter than approximately 300 nanometers, in the case of standard fluorescent lamps), but within the spectrum of natural daylight.

The sensor is located on the room-side of the shading means, facing the interior of the room. The output of the sensor is registered by control means, which in turn actuates shading means in response to the sensor output. Since the sensor responds only to wavelengths other than those produced by the lighting system, its output is dependent only on the daylight component of the light reflected from the room surfaces, and is not affected by the artificial component of the ambient illumination. In a typical application, the control means actuates the shading means to maintain a predetermined level of the sensor output. This predetermined level will generally be selected to correspond to the desired illuminance of the admitted daylight on a predetermined work surface (e.g., the surface of a desk). In a typical energy-saving application, this desired daylight illuminance will be the maximum daylight illuminance which can be tolerated by the office occupants without any compromise in their comfort or productivity.

Thus, the system provides closed-loop regulation of the admitted daylight and is able to accurately maintain the desired daylight illuminance, even in the presence of fluctuating levels of artificial light from the adaptive lighting system. It is therefore able to maximize the ratio of natural to artificial illumination—and thereby maximize the energy savings—without any connections to the lighting system, and without any compromise in the visual comfort of the office occupants.

In a preferred embodiment, the illuminance sensor is an IR-sensitive photodiode with integral optical filter, the control means is a microcontroller, and the shading means is a motorized venetian blind.

Description of the Preferred Embodiment

Figure 1:
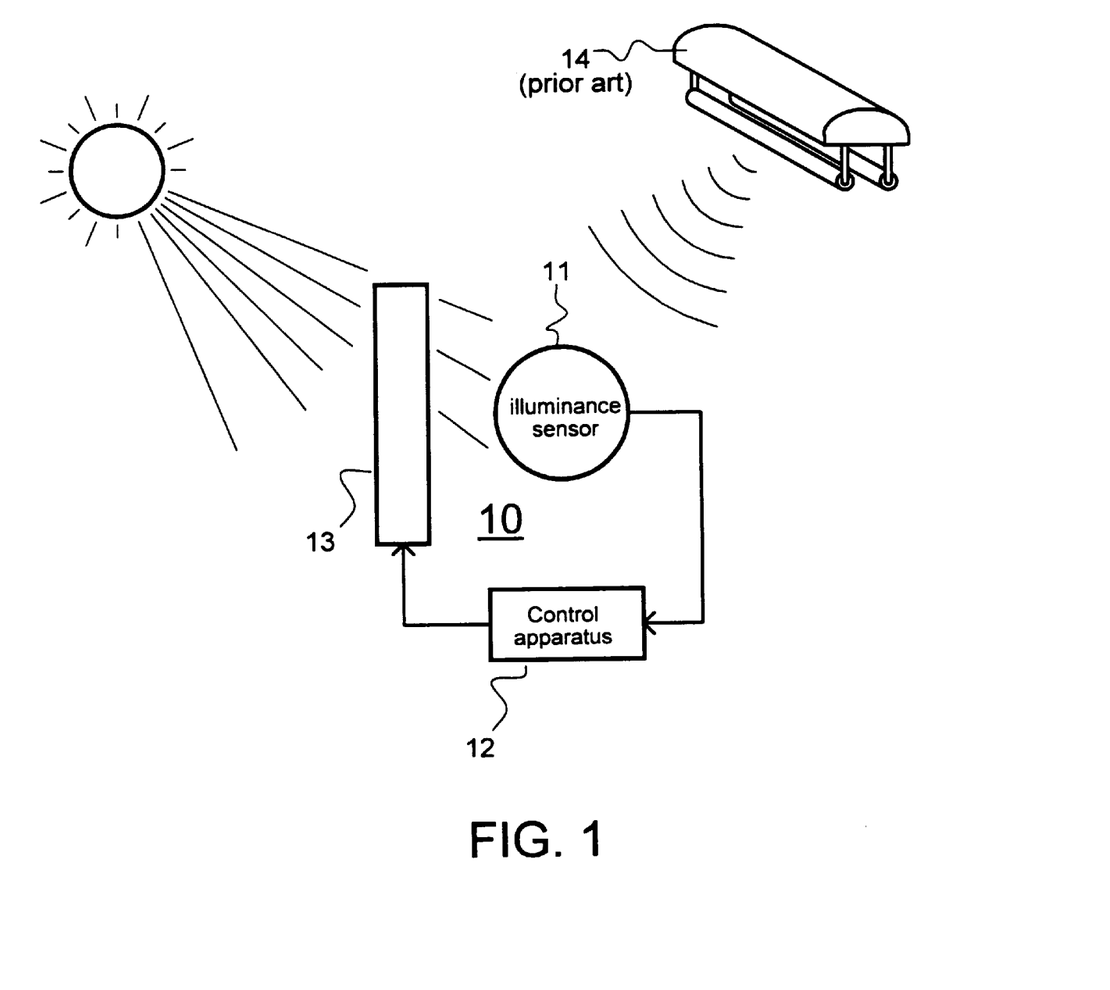
FIG. 1 shows a block diagram of a preferred embodiment of an adaptive window covering system according to the subject invention.

FIG. 1: Block Diagram of Adaptive Window Covering System 10

FIG. 1 shows a block diagram of a preferred embodiment of an adaptive window covering system 10 according to the subject invention. It consists of an illuminance sensor 11, a control apparatus 12, and shading means 13. System 10 is used in an environment which is periodically exposed to both sunlight and artificial light, the latter originating from a conventional electric lamp 14. Electric lamp 14 is of the gaseous-discharge type (e.g., a fluorescent lamp), and is powered from the AC mains. Sensor 11, control apparatus 12, shading means 13, and lamp 14 are typically located within a perimeter room of a commercial office building (not shown in FIG. 1).

Illuminance sensor 11 is a sensor which generates a sensing signal dependent on the brightness and wavelength of incident light. Shading means 13 is a conventional device which transmits a variable amount of incident daylight in response to an actuating signal. Control apparatus 12 is a conventional control device which registers the sensing signal of sensor 11 and generates the actuating signal for shading means 13. Sensor 11 and shading means 13 are positioned so that a portion of daylight transmitted by shading means 13 is sensed by sensor 11, either directly as shown in FIG. 1 or indirectly via reflection from another object. Sensor 11, control apparatus 12, shading means 13, and the operation of system 10 will be subsequently described in detail.

Illuminance Sensor 11

Spectral Response of Sensor 11

The purpose of illuminance sensor 11 is to generate a signal which represents the visible brightness of the admitted daylight, but which is unaffected by the light produced by lamp 14. This imposes two constraints on the spectral response of sensor 11:

A. In order to remain unaffected by the light produced by lamp 14, sensor 11 should ideally be insensitive to the radiant spectrum produced by lamp 14, i.e., sensor 11 should ideally produce a signal which is independent of the power contained in the spectrum produced by lamp 14. Accordingly, sensor 11 should ideally respond only to wavelengths either longer or shorter than those produced by lamp 14. In most energy-savings applications, lamp 14 will be of the fluorescent type, typically producing a radiant spectrum spanning approximately 300 nanometers to approximately 800 nanometers in wavelength. Therefore, when used with such a fluorescent lamp, sensor 11 should respond only to wavelengths either longer than 800 nanometers or shorter than 300 nanometers. Of course, in practice it may not be possible to obtain a sensor which is completely insensitive to the spectrum produced by lamp 14, nor is such a sensor absolutely necessary. In fact, system 10 can still operate effectively even if sensor 11 exhibits a small response to the spectrum produced by lamp 14. The key criterion is that the spectral response of sensor 11 and the spectrum produced by lamp 14 be sufficiently displaced in wavelength so that sensor 11 senses only a small fraction (e.g., less than 10%) of the total power contained in the radiant spectrum produced by lamp 14. In other words, sensor 11 should be substantially insensitive to the spectrum produced by lamp 14, so that it produces a signal which is substantially independent of the total power contained in the spectrum produced by lamp 14.

B. However, in order to produce a signal which consistently represents the visible brightness of the admitted daylight over varying weather conditions, the spectral response of sensor 11 should not extend too far away from the visible spectrum. Otherwise, since atmospheric attenuation due to clouds and fog varies as a function of wavelength, variations in the weather will cause the output of the sensor to become decorrelated with the apparent brightness of the daylight. Although firm limits on the spectral response of sensor 11 have not yet been definitively established, testing indicates that system 10 performs well when sensor 11 responds to wavelengths as long as 1200 nanometers.

Therefore, illuminance sensor 11 should ideally have a band-pass characteristic, with the passband contained within a range extending from the wavelength at which the weather-induced path attenuation begins to differ appreciably from that experienced by the visible light, to the wavelength corresponding to the nearest edge of the spectrum produced by lamp 14. For example, when lamp 14 is a standard fluorescent lamp, sensor 11 should have a passband of approximately 800 nanometers to approximately 1200 nanometers.

Since it is important to minimize the response of sensor 11 to light produced by lamp 14, the passband of sensor 11 should have a relatively steep cut-off in the vicinity of the spectrum produced by lamp 14. On the other hand, the opposite edge of the passband (the edge furthest from the spectrum produced by lamp 14) is not so critical, and its cut-off need not be so steep.

Therefore, one attractive means of achieving the required spectral response is to implement sensor 11 as a combination of a photosensor having a relatively broad spectral response, and an optical high-pass or low-pass filter having a relatively sharp spectral response. For example, one attractive implementation of sensor 11 is to combine a device which has a spectral response spanning the near-IR region (e.g., a silicon photodiode) with a sharp, optical, low-pass filter having a cut-off wavelength of approximately 800 nanometers. Integrated packages combining such photodiodes and optical filters are commercially available from many sources.

Dynamic Range of Sensor 11

Although the luminous flux of daylight can vary over a very wide range, sensor 11 need not have such a wide dynamic range, since it measures the daylight reflected from the interior surfaces of the room, and (as subsequently described in detail) the closed-loop operation of system 10 will maintain an approximately constant level of daylight inside the room. In most applications, a dynamic range of 30 dB will be more than sufficient for sensor 11. As is known in the art, many types of sensors are capable of providing such a dynamic range.

Orientation and Field-of-View of Sensor 11

Sensor 11 is generally oriented to sense the daylight reflected by the room surfaces. In some applications, the field-of-view of sensor 11 will be non-critical. However, in other applications, it may be desirable to limit the field-of-view to only certain high-priority areas (e.g, the surface of a desk), where accurate regulation of the illumination is particularly important.

Preferred Embodiment of Sensor 11

Figure 2:
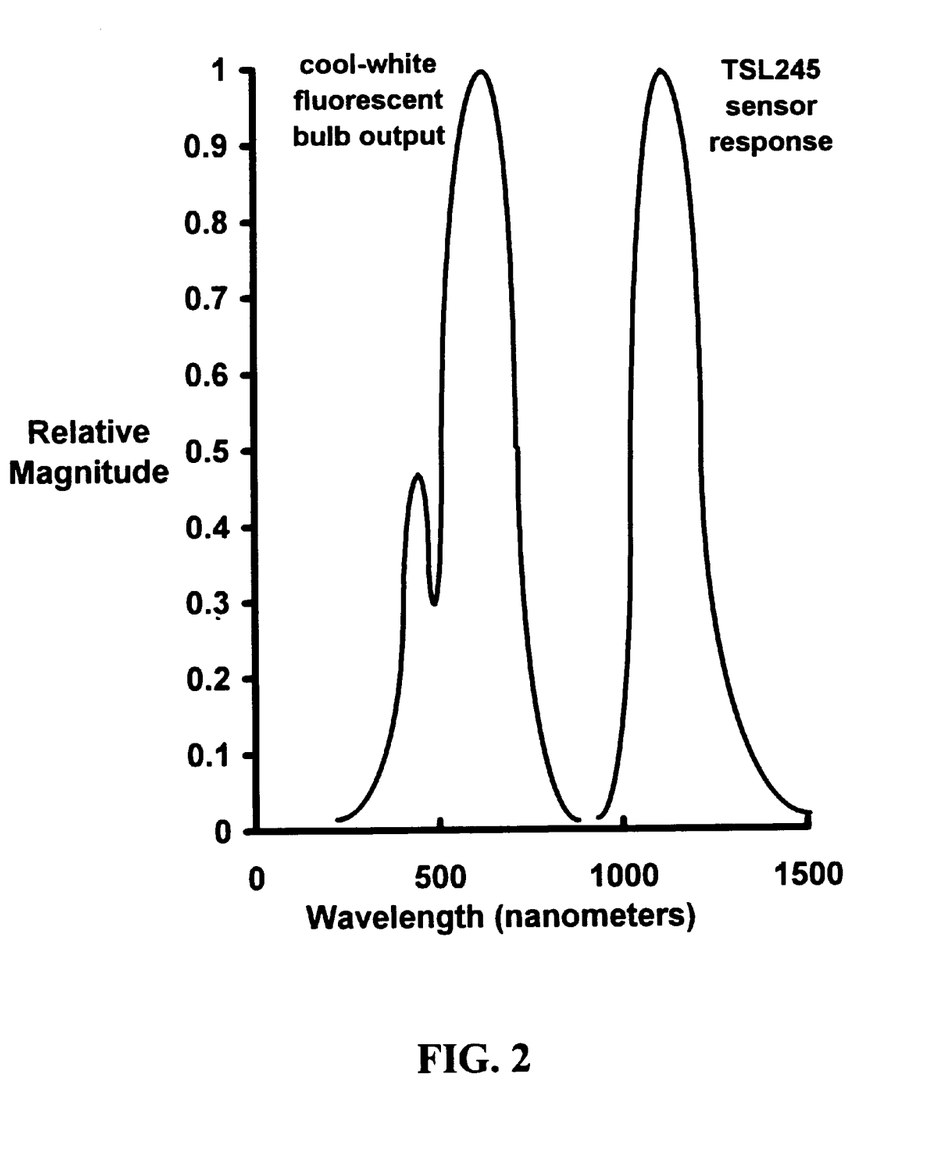
FIG. 2 is a curve showing the normalized spectral response of a preferred embodiment of an illuminance senor according to the subject invention, as well as the normalized spectral output of a typical fluorescent lamp, as a function of wavelength.

In the preferred embodiment, sensor 11 consists of the TSL245 InfraRed Light-to-Frequency Converter, manufactured by Texas Instruments, Incorporated. This device includes a silicon photodiode with integral low-pass optical filter, giving a −10 dB spectral response of 800 to 1100 nanometers. This is sufficient to avoid contamination by typical fluorescent sources, while still providing an output signal that is well-correlated to the apparent brightness of the admitted daylight.

As shown in FIG. 2 (which shows the relationship between the spectral response of the TSL245 and the power distribution of the radiant spectrum produced by a typical "cool-white" fluorescent bulb), the spectral response of the TSL245 falls outside the spectrum produced by a typical, widely used fluorescent source. However, the TSL245 is not completely insensitive to the spectra produced by other fluorescent lamps. For example, the fluorescent lamps known generally as the "deluxe warm white", "soft white", "chroma 50", or "chroma 75" types have an output which extends to wavelengths as long as 1000 nanometers, which is within the spectral response of the TSL245. However, the power produced at those wavelengths is a small fraction of the total power in the radiant spectra produced by such lamps. In other words, the TSL245 is substantially insensitive to the spectra produced by such bulbs, and can still be used effectively in system 10 when lamp 14 is of such a type.

The TSL245 produces a square wave with frequency proportional to the incident irradiance. It has a linear dynamic range of over 100 dB, with more than sufficient sensitivity to accurately measure the reflected daylight component in a perimeter room in a typical office building. Moreover, the square wave output facilitates interfacing with digital control devices, such as control apparatus 12.

In the preferred embodiment, sensor 11 is co-located with shading means 13, and faces inward and downward toward a predetermined area of the room.

Those skilled in the art will appreciate that many other types of photosensors are capable of meeting the aforementioned requirements, and could be effectively used in system 10. For example, instead of a light-to-frequency converter, any other type of light sensor (e.g., a light-to-voltage, light-to-current, or light-to-resistance converter) could be used—provided that the previously stated spectral-response requirements are met.

Control Apparatus 12

Control apparatus 12 is a conventional control apparatus capable of registering the output of sensor 11 and producing an actuating signal for shading means 13 which is a predetermined function of the output of sensor 11. In the preferred embodiment, this predetermined function is one which produces an actuating signal which causes shading means 13 to admit more daylight when the output of sensor 11 is below a predetermined threshold, and admit less daylight when the output of sensor 11 is above a predetermined threshold.

As is known in the art, there are many ways to implement such a function. In the preferred embodiment, control apparatus 12 is the PIC16C71 microcontroller, manufactured by Microchip Technology, Incorporated. The microcontroller registers the square wave produced by sensor 11, measures its frequency, and actuates shading means 13 by executing software instructions (as described subsequently) to implement the aforementioned control function. However, those skilled in the art will appreciate that there are many other known methods and devices capable of meeting the aforementioned requirements of control apparatus 12, and any of these could be used effectively in system 10 in accordance with the principles and requirements presented herein.

Shading Means 13

Shading means 13 is a conventional device capable of modulating the brightness of daylight passing through a window in response to an electrical signal. In the preferred embodiment, shading means 13 is a conventional, motorized, horizontal venetian blind having logic-level control inputs. Such a blind consists of an array of horizontal louvers whose orientation, or tilt, can be varied (through operation of an electric motor) in response to logic-level electrical signals registered on the control inputs. In the preferred embodiment, the motor is a fixed-speed device and blind has two control inputs. When a logic signal is asserted on one of the inputs, the motor operates to tilt the louvers in a particular direction; when a signal is asserted on the other input, the motor operates to tilt the louvers in the opposite direction. Many such motorized venetian blinds are known in the art. For example, such a device is described in my co-pending application, Ser. No. 08/505,845, filed Jul. 24, 1995.

However, those skilled in the art will appreciate that many other types of shading means could be used effectively in system 10, such as motorized shades, motorized curtains, or variable-transmissivity devices (such as liquid-crystal or electrochromic panels).

Operation of the Preferred Embodiment

Operating Concept

Referring again to FIG. 1, the operation of adaptive window covering system 10 is now described. In essence, system 10 operates as a closed-loop control system which periodically adjusts shading means 13 to attempt to maintain a constant, predetermined, reference irradiance on sensor 11. This operation is achieved by means of conventional software steps performed in control apparatus 12.

Software Operation

The design of software for closed-loop digital control systems is a well-developed art and is described extensively in the literature. There are many known techniques for designing and optimizing software for such systems according to the specific requirements of any given application, and such techniques can be used to develop software for apparatus 12, in accordance with the requirements outlined in this disclosure. Accordingly, the software operations described herein are intended primarily to provide an example of the operation of the preferred embodiment, rather than to present an optimum software implementation (which, of course, will vary with the specifics of the application). Practitioners in the art will recognize that the software operation of system 10 can and should be optimized, in accordance with conventional practice, to suit the requirements of the application at hand.

Figure 3:
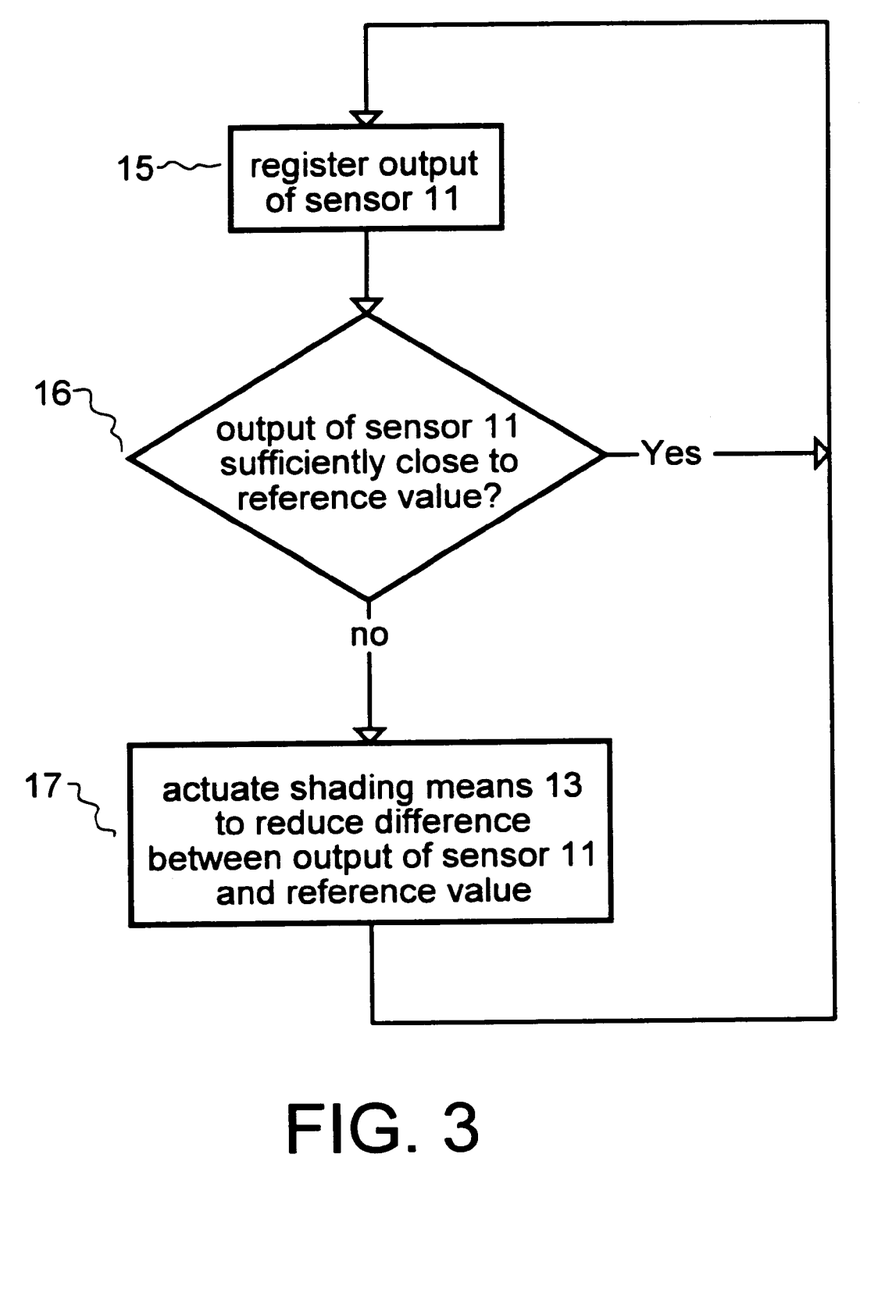
FIG. 3 is a flowchart of high-level software operations performed by a control apparatus according to the subject invention.

FIG. 3: Software Flowchart

FIG. 3 shows a high-level flowchart of exemplar software operations executed by control apparatus 12 in the operation of the preferred embodiment of system 10.

Software Step 15

The software operations begin with a software step 15, in which apparatus 12 registers the output of sensor 11. In the preferred embodiment, this is done by measuring the period of the square wave produced by the TSL245 light-to-frequency converter, which is inversely proportional to the incident irradiance. Since system 10 will attempt to maintain a roughly constant irradiance, the period of the square wave will typically vary over only a small dynamic range, with the average period depending on the room geometry, the reflectance of the room surfaces, and the illumination level desired by the occupants.

Software Step 16

Following software step 15, a software step 16 is executed, in which the irradiance measurement obtained in step 15 is compared with a predetermined reference value. This reference value represents the desired value of the irradiance incident on sensor 11, which may be fixed or (preferably) adjustable by the room occupants. The reference irradiance value will typically be chosen to correspond to a desired illuminance of the visible daylight on a given work surface (e.g., the surface of a desk).

If the difference between the output of sensor 11 and the reference value is within a predetermined limit, then software step 15 is repeated; otherwise, a software step 17 is executed.

Software Step 17

Overview of Step 17

In software step 17, shading means 13 is actuated to reduce the difference between the measured irradiance and the reference value. If the measured irradiance is less than the reference value, then shading means 13 is actuated to increase the amount of admitted daylight, while if the measured irradiance is greater than the reference value, then shading means 13 is actuated to decrease the amount of admitted daylight.

Special Considerations Associated with Use of Venetian Blind

In the preferred embodiment, shading means 13 is a motorized venetian blind. The amount of daylight admitted by such a blind depends on the tilt angle of the louvers: maximum daylight is admitted when the louvers are horizontal (i.e. when their surfaces are parallel to the ground), while the amount of daylight admitted decreases as the louvers are tilted away from the horizontal. The louvers can be tilted away from the horizontal in either of two directions: in the direction in which the inward-facing edges of the louvers are raised, or in the opposite direction in which the inward-facing edges of the louvers are lowered. Thus, the transmissivity of such a blind is not a monotonic function of the tilt angle, but instead increases and then decreases as the louvers are tilted from one travel limit to the other travel limit. As disclosed by Makino et al. in U.S. Pat. No. 4,622,470 (1986), this can cause improper operation of a closed-loop window covering due to the ambiguity in the effect of tilting the louvers in a given direction. Makino et al. show a relatively complex technique for mitigating this problem in the context of an analog closed-loop window covering intended for skylight applications.

A simpler technique is used in the preferred embodiment of system 10: the louver tilt is restricted to an operating range bounded by:
 the fully open position (with louvers horizontal), and
 the travel limit at which the inward-facing edges of the louvers are fully raised.

Restricting the operating range in this manner provides two benefits:
 the transmissivity-versus-tilt angle function is always monotonic, ensuring proper closed-loop operation of system 10; and
 any direct solar radiation—if present—is blocked, thereby preventing undesirable glare (note that this would not necessarily be the case if the louvers were tilted to move their inward-facing edges downward, rather than upward).

Operations Performed in Step 17

To achieve these objects, the following operations are performed in software step 17:
 If the measured illuminance is less than the reference value, then:
  If shading means 13 is already fully open (i.e., with its louvers horizontal), then no change is made and software step 15 is repeated.
  If shading means 13 is not fully open, then it is actuated to tilt its louvers toward the fully open position (i.e., with the short axis of the louvers parallel to the ground), after which software step 15 is repeated.
 On the other hand, if the measured illuminance is greater than the reference value, then:
  If shading means 13 is already fully closed, then no change is made and software step 15 is repeated.
  If shading means 13 is not fully closed, then it is actuated to tilt the louvers away from the fully open position, after which software step 15 is repeated.

Figure 4:
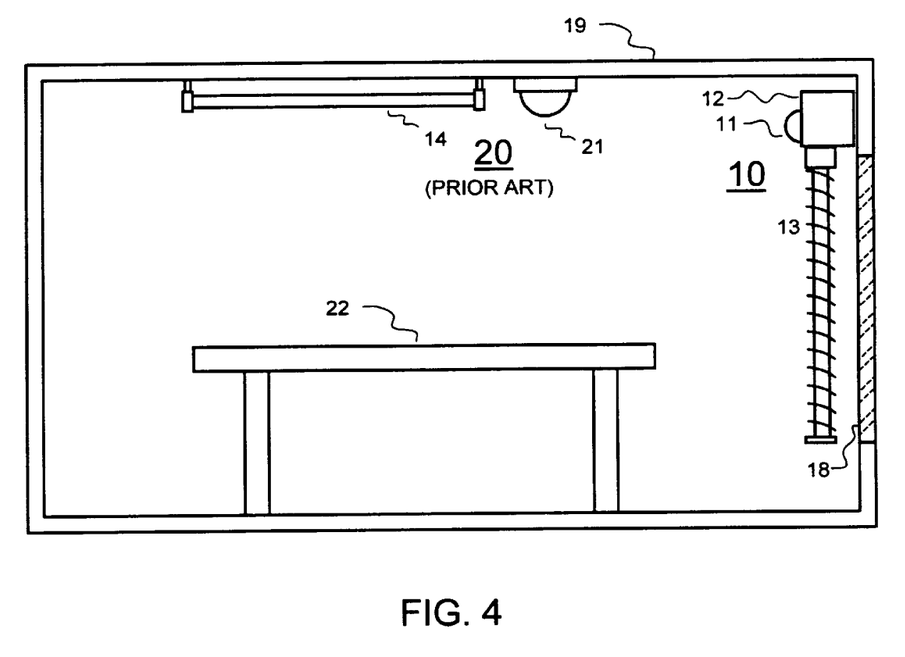
FIG. 4 is a diagram showing a typical installation of a preferred embodiment of the subject invention.
Figure 5:
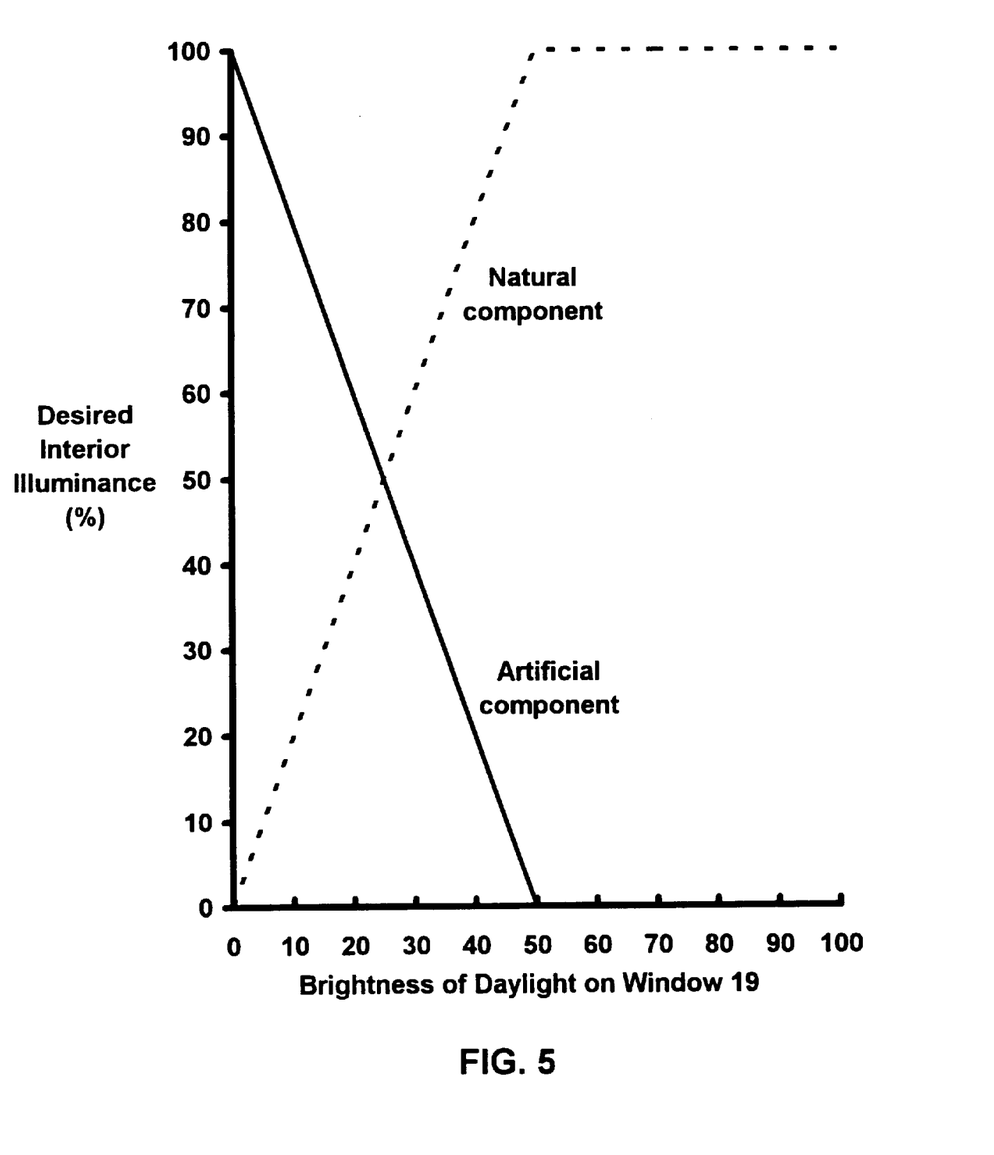
FIG. 5 is a plot showing the natural and artificial components of illumination expected in a typical installation of a preferred embodiment of the subject invention.

FIGS. 4 & 5: A Typical Application

Referring to FIG. 4, a typical application of system 10 is now described.

Shading means 13 of system 10 is mounted to a window 18 located within a perimeter room 19 of a typical office building.

Also located within room 19 is a conventional adaptive lighting system 20, which includes lamp 14 and a conventional illuminance sensor 21. System 20 is a conventional system which varies the brightness of lamp 14 to maintain a predetermined, desired, total interior illuminance as sensed by sensor 21. Such adaptive lighting systems are available from several manufacturers, including Lutron Incorporated (of Coopersburg, Pa., USA) and Electronic Lighting, Incorporated (of Newark, Calif., USA).

Sensor 11 and sensor 21 are oriented to face the same general location within room 19, e.g. the surface of a desk 22. Thus, since sensor 11 is responsive to daylight but unresponsive to the light produced by lamp 14, system 10 attempts to maintain the desired daylight component of the illuminance on the selected surface. On the other hand, sensor 21 is responsive to both daylight and the light produced by lamp 14, so lighting system 20 attempts to maintain the desired total illuminance on the same surface. In a typical energy-savings application, the desired daylight component of the illuminance will be equal to the desired total illuminance, so that—when sufficient daylight is incident on the outer surface of window 18—all of the illumination requirements can be met by the admitted daylight, and negligible power need be consumed by lamp 14. FIG. 5 shows the daylight and artificial components of the illuminance, as a function of the brightness of the incident daylight, for such an application.

As an illustration of the operation of system 10 and system 20, assume that the amount of daylight incident on the outer surface of window 18 slowly increases from complete darkness (a relative brightness of zero per the curve of FIG. 5) to intense direct sun (a relative brightness of 100 percent per the curve of FIG. 5). Then, referring again to FIG. 5:
 When no daylight is incident on window 18 (i.e., with a relative brightness of zero, per the curve of FIG. 5), system 10 actuates shading means 13 to the fully open position in an attempt to maintain the desired daylight illuminance. However, since no daylight is available, 100 percent of the desired total interior illuminance must be provided by lamp 14; therefore, system 20 actuates lamp 14 to near-full brightness.

As the level of daylight incident on window 18 begins to increase, the daylight illuminance inside room 19 also increases. Therefore, the net interior illuminance rises, causing system 20 to begin to dim lamp 14, thereby saving energy while maintaining the desired total interior illuminance.

With further increases in the level of incident daylight, lamp 14 will dim still further (increasing the rate of energy savings), while shading means 13 remains fully open—until the daylight illuminance inside room 19 reaches the desired daylight illuminance value (in the exemplar curve of FIG. 5, this occurs when the daylight incident on the outer surface of window 18 has reached a relative brightness of 50 percent). At this point, lamp 14 will have reached minimum brightness, and the ratio of natural-to-artificial illumination (and hence, the rate of energy savings) will have reached its maximum value.

As the level of daylight increases still further, system 10 will begin closing shading means 13 in order to maintain the desired interior daylight illuminance. Since there will be no change in the total interior illuminance, no further dimming of lamp 14 will occur, and the maximum ratio of natural-to-artificial illumination will be maintained.

Alternative Embodiments

Analog Control

Although the preferred embodiment of system 10 involves digital closed-loop control, those versed in the art will recognize that analog closed-loop control is also possible and may be advantageous in some applications.

Analog closed-loop adaptive window coverings are well-known in the art. For example, the aforementioned U.S. Pat. No. 3,294,152 to Kuijvenhoven (1966), U.S. Pat. No. 3,646, 985 to Klann (1972), U.S. Pat. No. 4,396,831 to Yamada et al (1983), and U.S. Pat. No. 4,622,470 to Makino et al (1986) all disclose analog closed-loop adaptive window covering systems in which the output of a photosensor is compared to a reference level to obtain an error signal which actuates shading means. All these systems share the overall objective of regulating the interior brightness.

Each of the aforementioned disclosures suggests the use of photo-conductive cells for sensing the ambient illumination. As is known in the art, the spectral response of such devices overlaps the spectrum of conventional electric lamps (including fluorescent lamps); therefore, as disclosed, such devices are unsuitable for the subject invention. However, useful alternative embodiments of the subject invention could be implemented by replacing the photoconductive cells of these prior-art systems with suitable analog sensors according to the requirements stated herein for sensor 11.

Such analog embodiments might have a slight cost advantage relative to the preferred digital embodiment disclosed herein. However, as is well-known in the art, digital systems generally offer better stability and flexibility than their analog counterparts. The selection between analog and digital embodiments of the subject invention should be made in accordance with conventional practice, given the specific requirements of the application at hand.

Alternative Control Functions

As stated previously, apparatus 12 generates an actuating signal which causes shading means 13 to decrease the amount of admitted daylight when the output of sensor 11 is above a predetermined reference level, and to increase the amount of admitted daylight when the output of sensor 11 is below a predetermined reference level.

However, those skilled in the art of closed-loop control systems will recognize that more complex control functions are possible and may be advantageous in certain applications. For example, hysteresis could be introduced into the control function, giving system 10 a different response to increasing and decreasing light levels. This might be useful to cure a tendency toward unwanted oscillations (often referred to as "hunting") in the setting of system 13, which could arise in certain embodiments of system 10. Many other techniques are known in the art for optimizing the control functions of closed-loop systems, and many of these could be applied to system 10 in accordance with conventional practice.

As another example, system 10 could be modified so that the actuating signal is not a function solely of the output of sensor 11, but is also dependent on other variables, such as user commands, the exterior brightness, the position of the sun, the time of day, or the on/off status of the lamp 14. For example, system 10 could be modified to provide a "thermal management" function which periodically over-rides the daylight-regulation function; e. g. to open shading means 13 at night-time during the summer (to maximize radiational cooling), and close shading means 13 at night-time in the winter (to minimize radiational cooling). Alternatively, the system could be modified to provide a "privacy function" which automatically closes shading means 13 at night-time when lamp 14 is on. Many such capabilities and functions are described in connection with the autonomous daylighting system disclosed in my aforementioned U.S. Pat. No. 5,663,621, as well as the dual-mode automatic window covering disclosed in my U.S. Pat. No. 5,598,000 (1997). All of these functions and capabilities could be added to system 10 via the appropriate hardware and software modifications, as taught in my aforementioned patents and in accordance with conventional practice.

Alternative Software Operation

As previously stated, the exemplar software operations shown in FIG. 3 can, and should, be optimized (in accordance with conventional practice in the art of closed-loop control systems) to suit the specific requirements of the application at hand. For example, fixed or variable delays could be added to the software steps shown in FIG. 3 to achieve a desired transient response, and (as previously stated) hysteresis could be introduced into the comparison performed in software step 16 in order to eliminate undesirable oscillation or "hunting".

Alternative Embodiments of Sensor 11

In the preferred embodiment, sensor 11 is the TSL245 light-to-frequency converter manufactured by Texas Instruments, Incorporated. However, many other sensors are known in the art which can meet the requirements given herein for sensor 11. For example, a photodiode, photoresistor, or phototransistor (with the appropriate optical filter and appropriate conventional conditioning circuitry, as required) could be used to implement sensor 11. As previously stated, sensor 11 could be designed to respond to either side of the spectrum produced by lamp 14: either the near-UltraViolet (UV) wavelengths on the short-wavelength side of the spectrum of lamp 14, or (as in the case of the preferred embodiment) the near-InfraRed (IR) wavelengths on the long-wavelength side of the spectrum produced by lamp 14.

The preferred embodiment of sensor 11 produces a pulse train whose frequency is proportional to the incident irradiance. However, sensor 11 could instead be a device which produces either an analog output (e.g., a voltage, current, or resistance proportional to the incident irradiance) or a digital output (i.e. a parallel code or serial bit stream representing the digital value of the irradiance).

If sensor 11 has an analog output, then an analog control element might be used for control apparatus 12 (see below) to implement an analog control system. Alternatively, control apparatus 12 could include an on-board analog-to-digital converter to digitize the output of sensor 11.

The optimum embodiment of sensor 11 for a given application can be selected according to conventional practice, with consideration given to the requirements presented herein.

Alternative Embodiments of Control Apparatus 12

In the preferred embodiment, control apparatus 12 is the PIC16C71 microcontroller, manufactured by Microchip Technology, Incorporated. However, the requirements for apparatus 12 are modest, and a wide variety of available microcontrollers would suffice in this application.

Alternatively, control apparatus 12 could be one of several available microcontrollers with integral Analog-to-Digital (A/D) conversion capability, which might be advantageous if sensor 11 has an analog output.

Also, as previously stated, system 10 could be implemented as an analog feedback control system, in which case sensor 11 could be designed to have an analog output and control apparatus 12 could be an analog processing element (such as an operational amplifier, with appropriate loop filter). An example of such an analog processing element is the "electrical control circuit 30" shown by Klann (U.S. Pat. No. 3,646,985, FIG. 2).

Finally, the functions performed by control apparatus 12 could be performed by specialized digital control circuitry. For example, control apparatus 12 could be implemented as a digital frequency comparator, which compares the frequency of the signal produced by sensor 11 of the preferred embodiment to a reference frequency (corresponding to the desired daylight illuminance) in order to generate an actuating signal for shading means 13.

The optimum embodiment of control apparatus 12 for a given application can be selected according to conventional practice, with consideration given to the requirements presented herein.

Alternative Embodiments of Shading Means 13

As previously stated, the preferred embodiment of shading means 13 is a conventional, motorized, horizontal venetian blind. However, any window covering with electronically variable solar-optical properties could be used as shading means 13. In fact, any other means of electronically varying the amount of daylight admitted by the host window could be used in place of shading means 13. Some potentially advantageous alternatives to the preferred embodiment of shading means 13 are described in the following paragraphs, but any other variable illumination transmission means could be used according to the invention described herein.

Variable-Speed Blinds

The motorized horizontal blind of the preferred embodiment includes a set of horizontal louvers whose orientation or tilt can be varied through operation of a fixed-speed electric motor, in response to logic-level control signals. However, it is apparent that a motorized blind having a variable-speed motor could also be used. This would require modification of control apparatus 12 and the associated software in a conventional manner to generate the appropriate actuating signals for shading means 13 (i.e., to control the speed as well as the direction of the motor). Such a modification would allow the motor to run at a relatively slow speed when making fine adjustments (minimizing noise and reducing the risk of overshoot), while running at a faster speed to minimize the time required to make larger adjustments.

Other Motorized Window Coverings

Shading means 13 need not be a horizontal venetian blind; other conventional shading devices could also be used. These include vertical venetian blinds, pleated shades, drapes, and roller shades. Some examples of electronically controlled window coverings using such shading devices include:

the model 5100 motorized vertical venetian blind manufactured by SM Automatic of Culver City, Calif.;

the Automatic Drapery Opener System manufactured by Makita USA, Inc., of La Mirada, Calif.;

the Roller Shade Lift System manufactured by Bautex USA, Inc., of Dallas, Tex.; and the transmittance-adjustable window disclosed in U.S. Pat. No. 5,164,856 to Zhangi et al. (1992).

Electronically Controlled, Variable-Transmissivity Devices

The venetian blind comprising the preferred embodiment of shading means 13 is an electro-mechanical device. However, purely electronic devices—with no moving parts—are also known which are capable of transmitting a variable amount of light in response to a control signal. Such a device, herein referred to as a variable transmissivity device, could serve as a useful embodiment of shading means 13. Such a device could be built-in to the host window or could be added to an existing window (either as a separate panel, or as a coating to the window surface) to provide the functions previously described for shading means 13.

Many types of variable-transmissivity devices are known in the art. Two well-known categories of such devices are liquid-crystal-based devices and electrochromic devices. Variable-transmissivity windows using liquid-crystal films have been available for many years, but have had limited commercial success due to high cost. More recently, practical electrochromic glazings have been developed. The use of such glazings has recently been investigated, for example, at the Energy and Environment Division of Lawrence Berkeley Laboratory, Berkeley, Calif. Other practical electronically controlled variable-transmissivity devices are also now emerging.

Such devices offer the advantages of infinitely variable adjustment and silent operation. While they are still expensive relative to motorized horizontal venetian blinds, such devices are rapidly maturing and their costs may eventually drop below those of conventional window coverings. At that point, such a device will most likely emerge as the preferred embodiment of shading means 13.

Conclusions, Ramifications, and Scope

From the preceding discussion, it is evident that adaptive window covering system 10 is capable of maintaining the desired level of daylight illuminance inside room 19, despite fluctuations in the brightness of daylight incident on window 18 (e.g., due to movements of the sun and changing weather conditions) or variations in the output of lamp 14 (e.g, due to the operation of adaptive lighting system 20). Therefore, it is apparent that system 10 can be used to maximize the amount of useful daylight admitted into room 19, thereby minimizing the need for artificial illumination and maximizing the energy savings provided by conventional adaptive lighting system 20.

It is also evident that system 10 is a closed-loop system (which directly senses the admitted daylight via sensor 11), and is therefore capable of relatively accurate regulation of the admitted daylight.

It is further evident that system 10 achieves the aforementioned objects without need for connections or modifications to the lighting system, thereby substantially reducing net costs relative to prior-art approaches—and enabling system 10 to be used with any adaptive lighting system, regardless of design or manufacture.

Although adaptive window covering system 10 is the preferred embodiment of the subject invention, it will be apparent that many other useful embodiments are possible. Those skilled in the art will recognize that the construction and function of the elements composing the preferred and alternative embodiments described herein may be modified, eliminated, or augmented to realize many other useful embodiments, without departing from the scope and spirit of the invention as recited in the appended claims.

I claim:

1. A daylight-regulation system for automatic regulation of daylight passing through a host window onto a work surface within a room, said daylight-regulation system including:

(a) shading means for varying said daylight passing through said host window in response to an actuating signal;

(b) sensing means for sensing a portion of said daylight reflected from said work surface, said sensing means producing a sensing signal, said sensing means co-located with said shading means, said sensing means having a field-of-view oriented toward said work surface, said sensing means substantially insensitive to spectral wavelengths produced by a predetermined type of fluorescent lamp;

(c) a control apparatus connected to said sensing means to register said sensing signal and produce said actuating signal as a function of said sensing signal;

whereby said daylight-regulation system provides regulation of said daylight on said work surface by actuating said shading means in response to said portion of said daylight reflected from said surface;

whereby said regulation of said daylight is substantially unaffected by varying levels of artificial illumination produced by a conventional adaptive lighting system using said type of fluorescent lamp; and whereby said daylight-regulation system can operate cooperatively with said conventional adaptive lighting system to maintain a desired net level of illumination within said room, while simultaneously maximizing a ratio of natural illumination to artificial illumination, without need for connections between said daylight-regulation system and said adaptive lighting system.

2. The system of claim 1 wherein said sensing means consists of a photosensor and optical filtering means, said photosensor responsive to near-infrared wavelengths, said optical filtering means having a low-pass characteristic, whereby said optical filtering means passes only wavelengths longer than a predetermined limit.

3. The system of claim 2 wherein said photosensor is a silicon photodiode.

4. The system of claim 1 wherein said shading means is a motorized venetian blind.

5. The system of claim 1 wherein said shading means is a variable-transmissivity device.

6. A daylight-regulation system for automatic regulation of daylight passing through a host window onto a work surface within a room, said daylight-regulation system including:

(a) shading means for varying said daylight passing through said host window in response to an actuating signal;

(b) sensing means for sensing a portion of said daylight reflected from said work surface, said sensing means producing a sensing signal, said sensing means co-located with said shading means, said sensing means having a field-of-view oriented toward said work surface, said sensing means substantially insensitive to spectral wavelengths within a range bounded by approximately 400 nanometers and approximately 700 nanometers, whereby said sensing means is substantially insensitive to radiant spectra produced by standard fluorescent lamps;

(c) a control apparatus connected to said sensing means to register said sensing signal and produce said actuating signal as a function of said sensing signal;

whereby said daylight-regulation system provides regulation of said daylight on said work surface by actuating said shading means in response to said portion of said daylight reflected from said surface;

whereby said regulation of said daylight is substantially unaffected by varying levels of artificial illumination produced by conventional, high-efficiency adaptive lighting systems using standard fluorescent lamps; and whereby said daylight-regulation system can operate cooperatively with a conventional adaptive lighting system to maintain a desired net level of illumination within said room, while simultaneously maximizing a ratio of natural illumination to artificial illumination, without need for connections between said daylight-regulation system and said adaptive lighting system.

7. The system of claim 6 wherein said sensing means consists of a photosensor and optical filtering means, said photosensor responsive to near-infrared wavelengths, said optical filtering means having a low-pass characteristic, whereby said optical filtering means passes only wavelengths longer than a predetermined limit.

8. The system of claim 7 wherein said photosensor is a silicon photodiode.

9. The system of claim 6 wherein said shading means is a motorized venetian blind.

10. The system of claim 6 wherein said shading means is a variable-transmissivity device.

11. A daylight-regulation system for automatic regulation of daylight passing through a host window into a room, said daylight producing a natural illumination within said room, said daylight-regulation system including:

(a) a light sensor, said sensor located within said room, said light sensor exposed to said natural illumination, said light sensor producing a sensing signal, said light sensor comprising a photosensitive device and optical filtering means, said photosensitive device responsive to near-infrared wavelengths, said optical filtering means having a low-pass characteristic, said optical filtering means providing attenuation of wavelengths shorter than approximately 700 nanometers, whereby said light sensor is sensitive to near-infrared solar radiation but substantially insensitive to radiant spectra produced by standard fluorescent lamps;

(b) a control apparatus connected to said light sensor to register said sensing signal, said control apparatus producing an actuating signal as a function of said sensing signal;

(c) shading means for varying said daylight passing through said host window in response to said actuating signal, said shading means connected to said control apparatus and operative to regulate said daylight in response to said actuating signal;

whereby said daylight-regulation system provides regulation of said daylight passing through said host window into said room by actuating said shading means in response to said natural illumination;

whereby said regulation of said daylight is substantially unaffected by varying levels of artificial illumination produced by conventional, high-efficiency adaptive lighting systems using standard fluorescent lamps; and whereby said daylight-regulation system can operate cooperatively with a conventional adaptive lighting system to maintain a desired net level of illumination within said room, while simultaneously maximizing a ratio of natural illumination to artificial illumination, without need for connections between said daylight-regulation system and said adaptive lighting system.

12. The system of claim 11, wherein said photosensitive device is a silicon photodiode.

13. The system of claim 11, wherein said shading means is a motorized venetian blind.

14. The system of claim 11 wherein said shading means is a variable-transmissivity device.

* * * * *